(12) United States Patent
Kim

(10) Patent No.: US 7,861,899 B2
(45) Date of Patent: Jan. 4, 2011

(54) DISPENSER

(76) Inventor: Yong-Soo Kim, 134-27, Mochoong-Dong, Heungdeok-Gu, Cheongju-City, 361-140 (KR)

( * ) Notice: Subject to any disclaimer, the term of this patent is extended or adjusted under 35 U.S.C. 154(b) by 462 days.

(21) Appl. No.: 11/794,561

(22) PCT Filed: Jun. 10, 2005

(86) PCT No.: PCT/KR2005/001772

§ 371 (c)(1), (2), (4) Date: Jan. 11, 2008

(87) PCT Pub. No.: WO2006/126754

PCT Pub. Date: Nov. 30, 2006

(65) Prior Publication Data

US 2008/0093393 A1 Apr. 24, 2008

(30) Foreign Application Priority Data

May 27, 2005 (KR) .................. 10-2005-0044823

(51) Int. Cl. *B65D 43/00* (2006.01)
(52) U.S. Cl. .................. 222/402.18; 222/190
(58) Field of Classification Search ............ 222/402.18, 222/402.1, 190, 94, 105, 385, 321.7, 321.9, 222/145.5, 145.6
See application file for complete search history.

(56) References Cited

U.S. PATENT DOCUMENTS

| 3,992,003 | A | * | 11/1976 | Visceglia et al. ............... 222/94 |
| 4,050,613 | A | | 9/1977 | Corsette |
| 4,062,475 | A | * | 12/1977 | Harris et al. .................. 222/95 |
| 4,417,674 | A | * | 11/1983 | Giuffredi ............... 222/402.18 |
| 4,915,262 | A | | 4/1990 | Suck et al. |
| 5,397,059 | A | * | 3/1995 | Baudin ........................ 239/333 |
| 5,875,932 | A | * | 3/1999 | Meshberg .............. 222/153.13 |
| 6,126,042 | A | * | 10/2000 | Meshberg ................ 222/321.4 |
| 6,173,907 | B1 | * | 1/2001 | Benoist ....................... 239/337 |
| 6,196,275 | B1 | * | 3/2001 | Yazawa et al. ................. 141/3 |
| 6,296,156 | B1 | * | 10/2001 | Lasserre et al. .......... 222/402.1 |
| 6,401,979 | B1 | * | 6/2002 | Mekata et al. ............. 222/105 |
| 6,736,288 | B1 | * | 5/2004 | Green ......................... 222/94 |

FOREIGN PATENT DOCUMENTS

| EP | 0 202 464 | 11/1986 |
| KR | U-0116408 | 10/1996 |

* cited by examiner

*Primary Examiner*—Lien T Ngo
(74) *Attorney, Agent, or Firm*—Greer, Burns & Crain, Ltd.

(57) ABSTRACT

A single-use dispenser using air pressure and includes an outer vessel in which air and content material are charged, a fixed body coupled to an open upper end of the outer vessel, a valve installed in the fixed body for selectively dispensing the content material using pressurized air, and a push button coupled to a top of the valve for pushing the valve, thereby spraying out the content material and air, wherein the valve includes a hollow body, a hollow valve body elastically supported to a top of the body and moving into and out of a hollow of the body, a packing member installed on the valve body for blocking an orifice pipe, and an air suction hole formed to penetrate the body for supplementing air pressure of the outer vessel.

4 Claims, 4 Drawing Sheets

[Fig. 1]
[PRIOR ART]
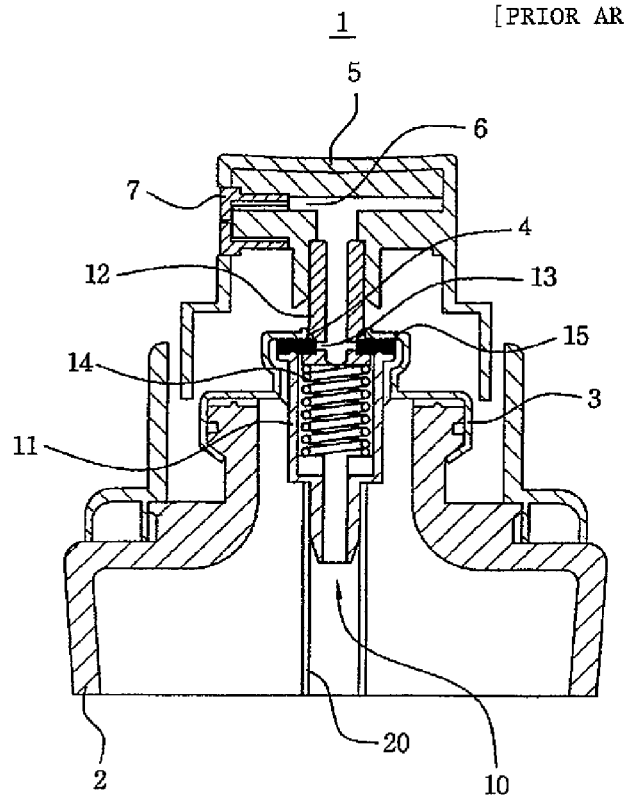
[Fig. 2]
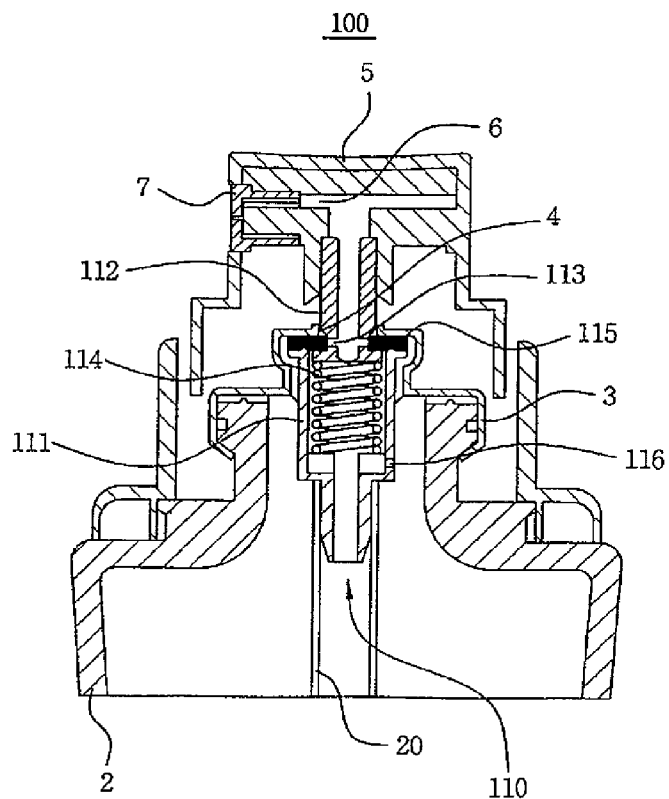

[Fig. 3]
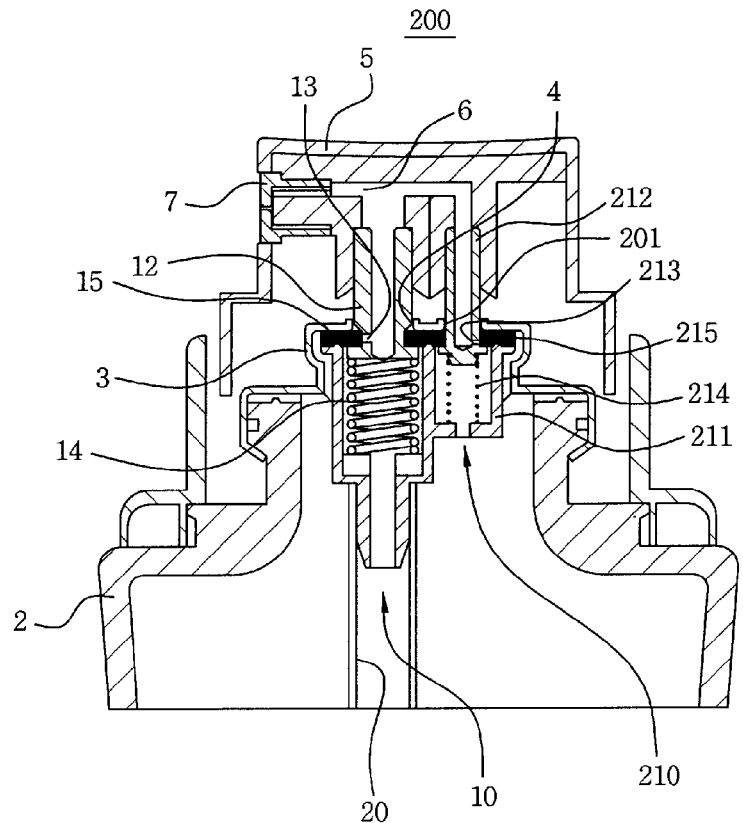
[Fig. 4]
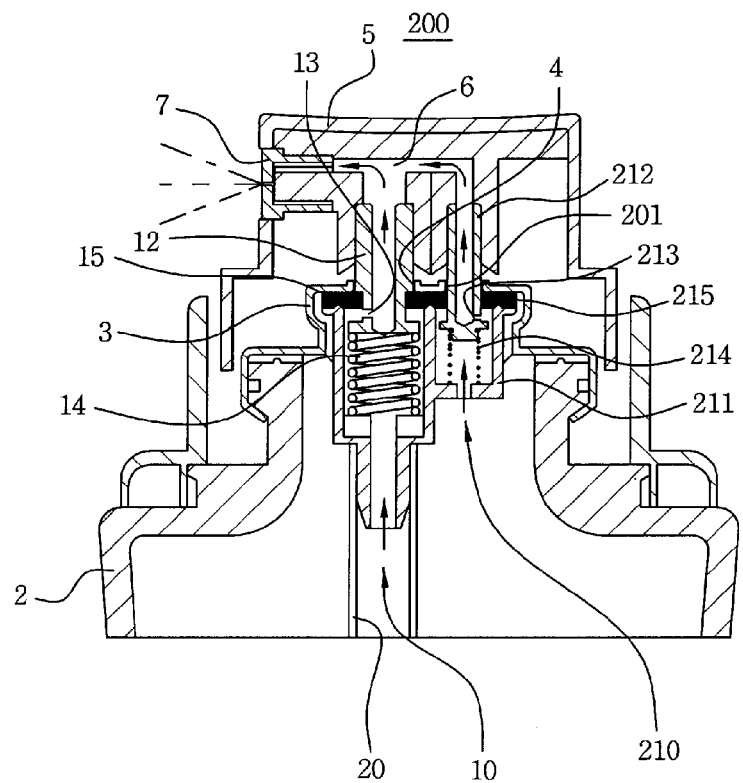

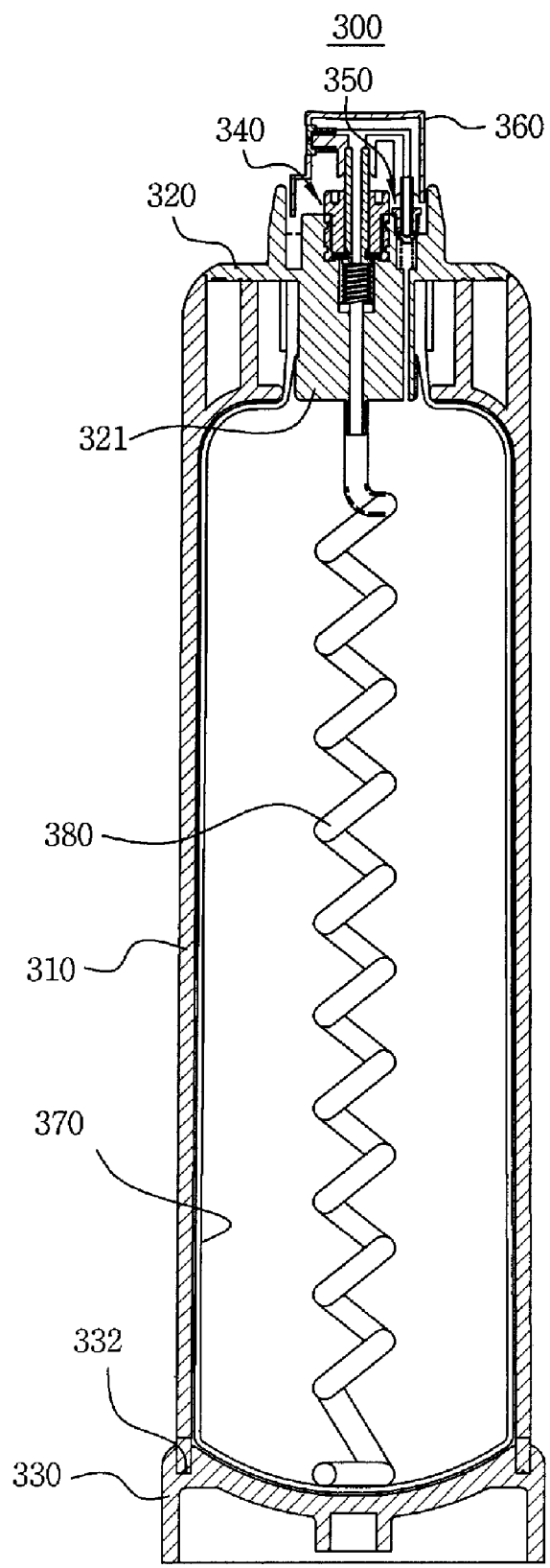
[Fig. 5]

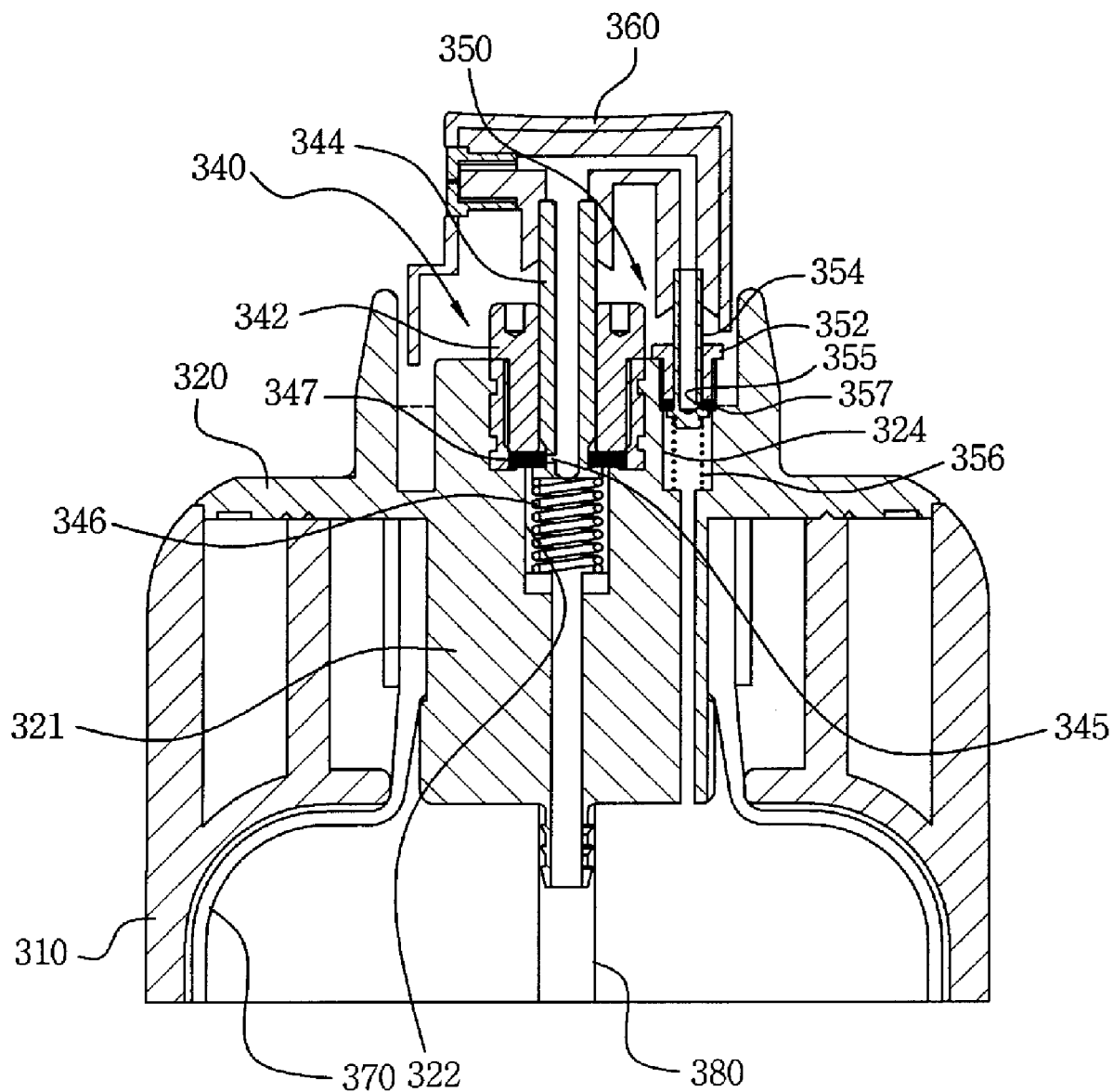
[Fig. 6]

DISPENSER

TECHNICAL FIELD

The present invention relates to a dispenser, and more particularly to a dispenser capable of smoothly dispensing a substance in a container in the form of a fine mist with the aid of air pressure or with the aid of both air pressure and a self-contraction characteristic.

BACKGROUND ART

Generally, aerosol is used to spray out liquid content such as insecticide, air freshener, deodorant, hair styling agent, and anticorrosive agent using a dispenser with the aid of air pressure. The aerosol uses butane as a carrier gas. Accordingly, the aerosol has a problem in that it causes environmental pollution. In order to solve this problem, a dispenser that can dispense liquid with the aid of air pressure or both air pressure and a self-contraction characteristic has been developed by the applicant of the present invention and is disclosed in Korean Utility Model Registration No. 486015.

Most dispensers including the above-described dispenser have the valve structured as shown in FIG. 1. Referring to FIG. 1, the conventional dispenser comprises an outer vessel 2, a fixed body 3, a valve 10 and a push button 5.

The outer vessel 2 has an open upper end. An upper end portion of the outer vessel 2 becomes stepwise smaller nearer the upper edge thereof. The upper end of the outer vessel 2 is coupled to the fixed body 3 and the valve 3 is installed in the fixed body 3, thus the outer vessel 2 is sealed.

The fixed body 3 is made of a metal panel and has a ring shape. The fixed body 3 becomes stepwise smaller nearer the upper edge thereof. The fixed body 3 is coupled to the outer vessel 2 in a manner such that the upper end portion of the outer vessel 2 is inserted into the lower end portion of the fixed body 3. The fixed body 3 has a valve installation hole 4 connected to the inner space of the outer vessel 2 on the upper surface thereof, so that the valve 10 is installed in the valve installation hole 4.

The valve 10 comprises a hollow cylindrical body 11 disposed in the fixed body 3, a hollow valve body 12 which is installed at an upper end portion of the cylindrical body 11 and moves into and out of the cylindrical body 11, an orifice pipe 13 installed to penetrate the valve body 12 so as to be connected to a hollow of the valve body 12, a spring 14 installed under the valve body 12 for elastically supporting the valve body 12, and a packing member 15 for sealing the orifice pipe 13. A push button 5 for operating the valve 10 is coupled to the top of the valve 10.

A discharge pipe 6 disposed under the push button 5 is inserted into an upper end portion of the valve body 12, so that the discharge pipe 6 is connected to an inner space of the valve 12. The discharge pipe 6 is open at the side of the push button 5. The discharge pipe 6 has an exit, and a nozzle 7 is installed on the exit of the discharge pipe 6 in order to spray content.

The operation of the above-described dispenser 1 will be briefly described. First, the outer vessel 2 is filled with content material and air pressure. Next, when a user pushes the push button 5, the content material is sprayed through the nozzle 7. When the push button 5 is pushed, the valve body 12 is also pushed downward, so that the orifice pipe 13 closed by the packing member 15 is opened. Accordingly, the content material in the outer vessel 2 moves upward through a straw 20, passes the hollow of the body 11 and is ejected.

However, the above-described dispenser has a problem in that it is difficult to use to spray fine mist such as hair styling agent because the air pressure in the outer vessel is insufficient.

DISCLOSURE OF INVENTION

Technical Problem

In order to solve the above problems, it is an object of the present invention to provide a dispenser capable of spraying fine mist because additional air pressure is added to inner air pressure when dispensing content material.

It is a further object of the present invention to provide a dispenser that can be manufactured at low cost and can be reused by manufacturing an outer vessel, an upper cap and a lower cap with synthetic resin and combining them through a high frequency welding method.

Technical Solution

In order to achieve the above objects and advantageous effects, according to one aspect of the present invention, there is provided a single-use dispenser using air pressure comprising an outer vessel, into which air pressure and content material are charged, a fixed body coupled to an open upper end of the outer vessel, a valve installed in the fixed body for selectively dispensing the content material and pressurized air, and a push button coupled to the top of the valve for pushing the valve, thereby spraying out the content material and air, wherein the valve comprises a hollow body, a hollow valve body elastically supported on the top of the body and moving into and out of a hollow of the body, a packing member installed on the valve body for blocking an orifice pipe, and an air suction hole formed to penetrate the body for supplementing air pressure of the outer vessel.

According to a further aspect of the present invention, there is provided a single-use dispenser using air pressure comprising an outer vessel having an open upper end and filled with content material and air, a fixed body coupled to the open upper end of the outer vessel, a valve installed in the fixed body for selectively discharging content material and air pressure, and a push button for spraying out the content material and air pressure by pushing the valve, wherein the dispenser further comprises an auxiliary valve installed near the valve for applying air pressure to the content material and air pressure discharged through the valve by guiding air pressure in the outer vessel to the push button, wherein the auxiliary valve comprises a hollow auxiliary body disposed in the fixed body, a hollow auxiliary valve body elastically supported to the top of the auxiliary body and moving into and out of the auxiliary body, and an auxiliary packing member for blocking an orifice pipe formed in the auxiliary valve body, and wherein the push button simultaneously pushes the valve and the auxiliary valve.

According to a still further aspect of the present invention, there is provided a reusable dispenser comprising an outer vessel having a cylindrical shape having respective open upper and lower ends, an upper cap coupled to the open upper end of the outer vessel, a lower cap fixedly coupled to the open lower end of the outer vessel, an inner vessel fixed to a lower part of the upper cap, filled with content material and air pressure, and having a self-contraction characteristic, a valve installed in the upper cap for selectively dispensing the content material and air pressure, and a push button for spraying out the content material and air pressure dispensed from the valve by pushing the valve, wherein the dispenser further comprises an auxiliary valve for guiding air pressure in the inner vessel toward the push button, thereby applying air pressure to the content material and air pressure dispensed from the valve, wherein the auxiliary valve comprises an auxiliary fixed body provided in an auxiliary mounting part formed in a manner such that it penetrates an edge portion of the upper cap, an auxiliary valve body disposed in the auxiliary fixed body and elastically moving in a vertical direction, and an auxiliary packing member for blocking an auxiliary orifice pipe of the auxiliary valve body, and wherein the push button simultaneously pushes the valve and the auxiliary valve.

The outer vessel, the upper cap, and the lower cap may be made of synthetic resin, and the upper cap and the lower cap are coupled to the outer vessel through an insertion jointing method and a high frequency welding method.

BRIEF DESCRIPTION OF THE DRAWINGS

FIG. 1 is a sectional view illustrating a dispenser according to the conventional art;

FIG. 2 is a sectional view illustrating a valve of a dispenser according to a first embodiment of the present invention;

FIG. 3 is a sectional view illustrating a valve of a dispenser according to a second embodiment of the present invention;

FIG. 4 is a sectional view illustrating the operation of the valve shown in FIG. 3;

FIG. 5 is a sectional view illustrating a dispenser according to a third embodiment of the present invention; and FIG. 6 is a sectional view illustrating a valve of the dispenser shown in FIG. 5.

BEST MODE FOR CARRYING OUT THE INVENTION

A dispenser according to a first embodiment of the present invention is a single-use dispenser capable of dispensing content material using air pressure. Referring to FIG. 2, the dispenser 100 according to the second embodiment of the present invention comprises an outer vessel 2, a fixed body 3, a valve 110 and a push button 5. The dispenser further comprises an air suction pipe 116 formed to penetrate a lower part of a body 111 of the valve 110, so that a hollow or inner space of the body 111 is connected to the outer space of the body 111.

The valve 110 is installed in a valve installation hole 4 of the fixed body 3. In more detail, the hollow cylindrical body 111 of the valve 110 is fixed in the fixed body 3, and a hollow valve body 112 is disposed in an upper end portion of the body 111 and moves in and out of the body 111. An orifice pipe 113 is installed on an outer surface of the valve body 112 in a manner such that it penetrates the valve body 112 and communicates with a hollow of the valve body 112. A spring 114 is disposed under the valve body 112 for elastically supporting the valve body 112. A packing member 115 is disposed on an outer surface of the valve body 112 in order to block the orifice pipe 113. The body 111 of the valve 110 further has an air suction hole 116 formed to penetrate the body 111 so that the air suction hole is connected to an inner space of the body 111.

The air suction hole 116 plays the role of adding additional air pressure to inner air pressure in the outer vessel when content material in the outer vessel moves up through a straw 20, so that it helps the content material be sprayed through a nozzle in the form of fine mist.

A dispenser according to a second embodiment of the present invention is a single-use dispenser for spraying out content material using air pressure, like the dispenser according to the first embodiment of the present invention. Referring to FIG. 3 and FIG. 4, the dispenser 200 according to the second embodiment of the present invention comprises an outer vessel 2, a fixed body 3, a valve 10 and a push button 5. The dispenser further comprises an auxiliary valve 210.

The auxiliary valve 210 plays the same role as the air suction hole 116 of the dispenser according to the first embodiment of the present invention. The air suction hole of the dispenser according to the first embodiment supplements air pressure in the body 111 of the valve 110, but the auxiliary valve 210 supplements air pressure in a discharge pipe 6 of a push button 5.

In order to compensate for the difference between the first embodiment and the second embodiment, an auxiliary valve installation hole 201 is formed near the valve installation hole 4 of the fixed body 3, and an auxiliary body 211 is formed at a side of the body 111 in a manner such that it is connected to the auxiliary valve installation hole 201. Further, an auxiliary valve body 212 and an auxiliary spring 214 are disposed on the auxiliary body 211 so that the auxiliary valve body 211 is elastically supported by the auxiliary spring 214, moving into and out of the auxiliary body 211. Still further, an auxiliary packing member 215 is added in order to block an auxiliary orifice pipe 213. The push button 5 is installed in a manner such that it simultaneously pushes the valve body 12 and the auxiliary valve body 212.

When the valve body 12 and the auxiliary valve body 212 are simultaneously pushed by the push button 5, content material and air are discharged into a hollow or inner space of the valve body 12, and only air is discharged into a hollow or inner space of the auxiliary valve body 212, so that additional air pressure is applied to the content material and air pressure in the discharge pipe 5 of the push button 5. As a result, content material can be sprayed through the nozzle 7 in the form of fine mist.

A dispenser according to a third embodiment of the present invention is a re-fill dispenser capable of spraying content material using both air pressure and self contraction force. Referring to FIG. 5 and FIG. 6, the dispenser 300 according to the third embodiment of the present invention comprises an outer vessel 310, an upper pack 320, a lower cap 330, an inner vessel 370, a valve 340 and a push button 360.

The outer vessel 310 is made of synthetic resin and has a cylindrical shape having open upper and lower ends. The upper cap 320 and the lower cap 330 are respectively coupled to upper and lower ends of the outer vessel 310 to seal the outer vessel 310.

The upper cap 320 is made of synthetic resin, like the outer vessel 310, and is coupled to the upper end of the outer vessel 310 through a high frequency welding method. The upper cap 320 plays the same role as the combination of the fixed body 3 and the valve body 211 in the second embodiment. The upper cap 320 has an extending part 321 at a lower center portion thereof, and the extending part 320 has a hollow at a center portion thereof and extends into the outer vessel 310. The upper cap 320 further has a mounting part 322, on which the valve 340 is installed, at an upper center portion thereof. A straw 380 is coupled to a lower end portion of the extending part 321. Further, the upper cap 320 further has an auxiliary mounting part 324 near the mounting part 322 in order to mount the auxiliary valve 350 thereon, and a through hole extending from the auxiliary mounting part 324 to the lower end of the extending part 321 is formed in the upper cap 320. That is, the mounting part 322 and the auxiliary mounting part 324 extend, penetrating the upper cap 320, to the lower end of the extending part 321, and the straw 380 is installed in the lower end of the mounting part 322.

The valve 340 comprises a fixed body 342 fixed and inserted into the mounting part 322, a valve body 344 disposed in the valve body 344 in a manner such that it can move in a vertical direction, a spring 346 for elastically supporting the valve body 344, and a packing member 347 for blocking an orifice pipe 345 of the valve body 344.

The auxiliary valve 350 comprises an auxiliary fixed body 352 fixed in the auxiliary mounting part 324, an auxiliary valve body 354 disposed in the auxiliary fixed body 352 in a manner such that it moves in a vertical direction, an auxiliary spring 356 for elastically supporting the auxiliary valve body 354, and an auxiliary packing member 357 for blocking an auxiliary orifice pipe 355 of the auxiliary valve body 354.

The push button 360 is installed on the valve body 344 and the auxiliary valve body 354 respectively belonging to the valve 340 and auxiliary valve 350.

The inner vessel 370, having a self contraction characteristic, is arranged in the outer vessel 310. The inner vessel 370 is fixed to an upper part of the extending part 321 by an insertion method. Accordingly, the mounting part 322 and the auxiliary mounting part 324 formed to penetrate through the extending part 321 are connected to the inner space of the inner vessel. The straw 380 is inserted into the lower end of the mounting part 322 and extends to the bottom of the inner vessel 370.

The lower cap 330 is also made of synthetic resin like the upper cap 320. The lower cap 330 has a ring-shaped groove 332 in which the lower end of the outer vessel 310 is inserted. The boundary between the lower cap 330 and the outer vessel 310 is welded through a high frequency welding method.

INDUSTRIAL APPLICABILITY

According to the present invention, the dispenser has an air suction hole or an auxiliary valve in order to supplement air pressure, thereby spraying content material through a nozzle in the form of a fine mist.

Since the outer vessel, the upper cap and the lower cap constituting the exterior of the dispenser are made of synthetic resin, the dispenser is lightweight and can be reused.

The dispenser according to the present invention is not limited to the above-described embodiment, but many variations and modifications can be made to the preferred embodiment without substantially departing from the principles and scope of the present invention.

The invention claimed is:

1. A single-use dispenser using air pressure, comprising:
an outer vessel, in which air and content material are charged;
a fixed body coupled to an open upper end of the outer vessel;
a valve installed in the fixed body for selectively dispensing the content material using pressurized air the valve including a hollow body, a hollow valve body elastically supported to a top of the hollow body and moving into and out of an inner space of the body, a packing member installed on the valve body for blocking an orifice pipe, an air suction hole formed to penetrate the body for supplementing air pressure of the outer vessel and a valve outlet;
an auxiliary valve installed near the valve for applying air pressure to the content material and air pressure discharged through the valve by guiding air pressure in the outer vessel to the push button, the auxiliary valve including a auxiliary valve outlet; and
a push button including a single discharge pipe in communication with a nozzle having a longitudinal axis, the discharge pipe being parallel to the longitudinal axis of the nozzle, wherein the valve outlet and the auxiliary valve outlet are connected directly to the discharge pipe, and wherein the push button is coupled to a top of the valve for simultaneously pushing the valve and the auxiliary valve, thereby spraying out the content material and air.

2. A single-use dispenser using air pressure, comprising:
an outer vessel having an open upper end and filled with content material and air;
a fixed body coupled to the open upper end of the outer vessel;
a valve including a valve outlet and installed in the fixed body for selectively discharging content material and air pressure;
a push button for spraying out the content material and air pressure by pushing the valve and including a single discharge pipe in communication with a nozzle, the nozzle having a longitudinal axis, wherein the discharge pipe is parallel to the longitudinal axis of the nozzle; and
an auxiliary valve installed near the valve for applying air pressure to the content material and air pressure discharged through the valve by guiding air pressure in the outer vessel to the push button via an auxiliary valve outlet, the auxiliary valve including a hollow auxiliary body disposed in the fixed body, a hollow auxiliary valve body elastically supported to a top of the auxiliary body and moving into and out of the auxiliary body, and an auxiliary packing member for blocking an orifice pipe formed in the auxiliary valve body, and an auxiliary spring configured to bias the auxiliary valve body to an extended position, wherein the valve outlet and the auxiliary valve outlet are connected directly to the discharge pipe, and wherein the push button simultaneously pushes the valve and the auxiliary valve.

3. A reusable dispenser comprising:
an outer vessel having a cylindrical shape having respective open upper and lower ends;
an upper cap coupled to the open upper end of the outer vessel;
a lower cap fixedly coupled to the open lower end of the outer vessel;
an inner vessel fixed to a lower part of the upper cap, filled with content material and air pressure, and having a self-contraction characteristic;
a valve including a valve outlet and installed in the upper cap for selectively dispensing the content material and air pressure;
a push button for spraying out the content material and air pressure dispensed from the valve in response to pushing of the valve and including a single discharge pipe in communication with a nozzle having a longitudinal axis, wherein the discharge pipe is parallel to the longitudinal axis of the nozzle; and
an auxiliary valve for guiding air pressure in the inner vessel toward the push button via an auxiliary valve outlet, thereby adding air pressure to the content material and pressurized air dispensed from the valve, the auxiliary valve including an auxiliary fixed body provided in an auxiliary mounting part formed in a manner such that it penetrates an edge portion of the upper cap, an auxiliary valve body disposed in the auxiliary fixed body and elastically moving in a vertical direction, and an auxiliary packing member for blocking an auxiliary orifice pipe of the auxiliary valve body, wherein the valve outlet and the auxiliary valve outlet are connected directly to the discharge pipe, and wherein the push button simultaneously pushes the valve and the auxiliary valve.

4. The dispenser according to claim 3, wherein the outer vessel, the upper cap, and the lower cap are made of synthetic resin, and the upper cap and the lower cap are coupled to the outer vessel through an insertion jointing method and a high frequency welding method.

* * * * *